July 12, 1932.  J. E. RENFER  1,866,819
HAMMER FOR ROCK DRILLS
Filed Oct. 19, 1929
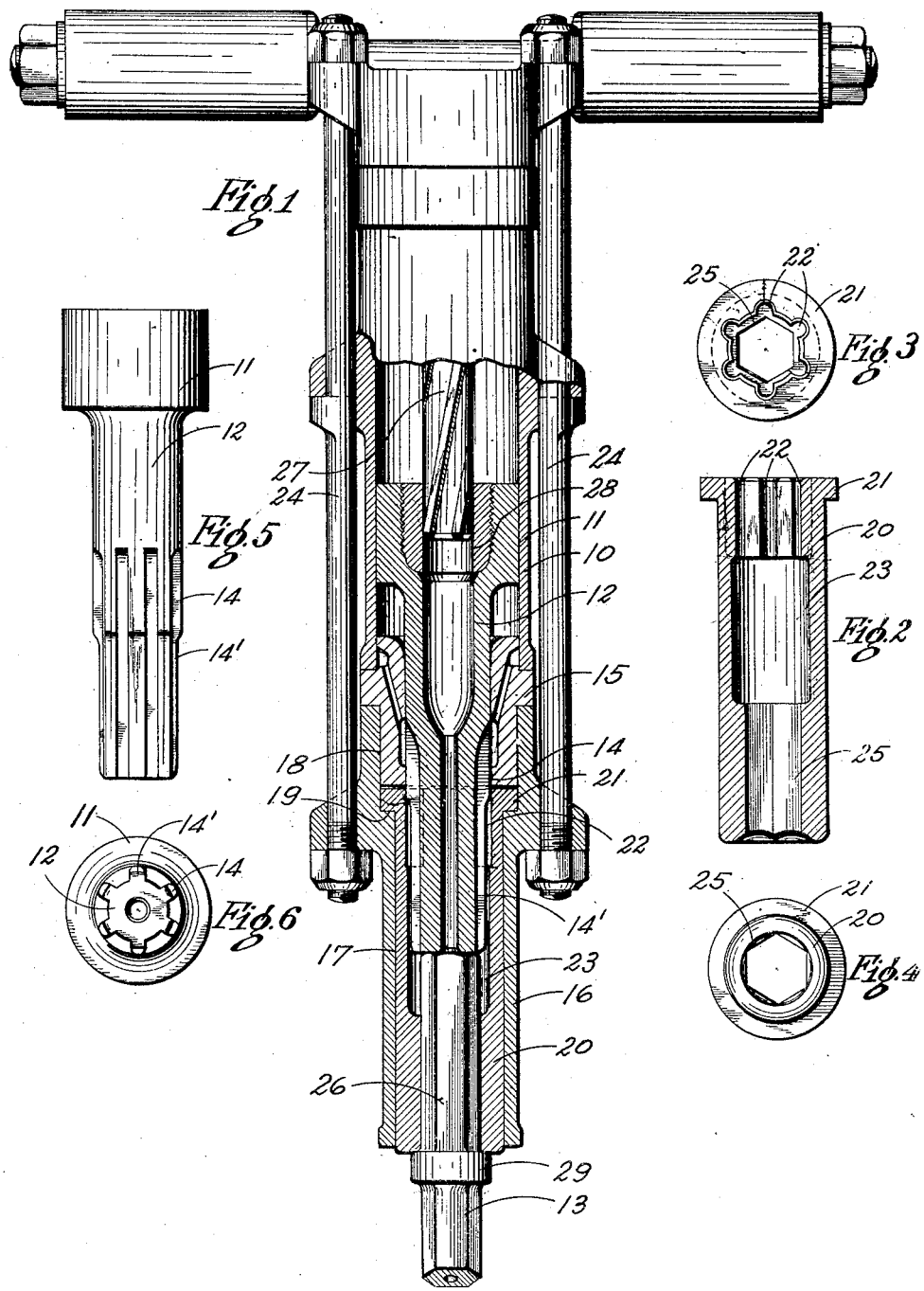
INVENTOR
JOHN E. RENFER
BY Ridley & Watts
ATTORNEY Patented July 12, 1932

1,866,819

UNITED STATES PATENT OFFICE

JOHN E. RENFER, OF CLEVELAND, OHIO, ASSIGNOR TO THE CLEVELAND ROCK DRILL COMPANY, OF CLEVELAND, OHIO, A CORPORATION OF OHIO

HAMMER FOR ROCK DRILLS

Application filed October 19, 1929. Serial No. 400,752.

The present invention relates broadly to rock drills of the percussion type, and more particularly to improvements in the mechanism for rotatively driving the cutting tool during reciprocative movement thereof.

The object of this invention is to provide a tool retaining member, or chuck, for a rock drill which is organized to secure a minimized frictional resistance between the elements with which is co-ordinated, to accommodate a wider range of manufacturing tolerances than has been permissible in similar tools of this type heretofore constructed, and to present an adequate cross-section for transmission of the torque produced by the rotative mechanism without increasing the dimensions and weight of the drill.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific combinations of parts and specific constructions indicative of the scope and spirit of the inventinon.

In the drawing which illustrates a preferred embodiment of the invention;

Fig. 1 is an elevational view, partly in section, of a rock drill constructed in accordance with this invention;

Fig. 2 is a longitudinal sectional view of the improved tool retaining member, or chuck, illustrating the driving and driven portions thereof;

Fig. 3 is an elevational view of the driven end of the chuck;

Fig. 4 is an elevational view of the driving end of the chuck;

Fig. 5 is a side elevation of a piston and hammer embodying the invention;

Fig. 6 is an end elevation of the hammer.

Referring to the drawing, in which like symbols designate corresponding parts throughout the several views, the rock drill comprises a cylinder 10, within which is reciprocably mounted a piston 11 formed with an extended stem portion or hammer 12 adapted to cooperate with the head of a cutting tool 13 in the manner customarily employed in percussive rock drills. Splines 14 are formed in the stem 12, the end portion thereof being circumferentially reduced to constitute relatively low keys on splines 14'.

Subjacent the cylinder 10 and co-axial therewith, is a spacer bushing 15, the inner bore of which serves as a bearing for the piston stem 12 to guide the latter in its reciprocative movement, and the lower annular edge of which serves as a thrust bearing for the chuck 20. A head 16, provided with a bore 17 and a counterbored portion 18 forming a shoulder 19 is secured to the cylinder 10 by means of bolts 24, the bore 18 thereof telescopically engaging the lower end of the bushing 15.

The chuck 20 is journalled in the bore 17 being retained therein by an annular flange 21 which bears upon the shoulder 19 and the lower edge of the bushing 15. The driven end of the chuck 20 is formed with internal splines 22 for cooperation with the splines 14 and 14' on the stem 12, the splines 22 being of a height to engage the bottoms of the grooves interjacent the keys 14 and 14' throughout their length. The driving end of the chuck 20 is provided with a machined aperture 25 having a polygonal cross-section adapted to slidably receive the polygonal head 26 of the cutting tool 13. A recess 23 diametrically proportioned slightly larger than the crest of the keys 14' though smaller circumferentially than the keys 22 formed intermediate the driving and driven ends of the chuck.

An externally rifled stem 27 depends from the upper portion of the drill and cooperates with a rifled aperture 28 formed in the piston 11 and the upper portion of the stem 12 to rotate the latter. The stem is organized with a ratchet mechanism, not shown, which permits the directional rotation thereof and effectuates an oscillating movement of the piston during its upward reciprocative movement.

It has been found in practice that the splines on the piston stem must be of a certain depth in order to carry the torsional strain applied thereto at the beginning of the upward stroke of the piston without breaking. These full depth splines require complemental spline grooves in the chuck such as grooves 22, shown in Figure 2 of the drawing. The extension of these full depth spline grooves throughout the length of the chuck, however, considerably weakens the walls of the chuck so that when the piston stem is partially restricted from the spline grooves in the chuck, there is a marked tendency for the lower end of the chuck to break off under the torsional strain. These difficulties have been overcome by the provisions of the splines of different depths on the piston stem. The full depth splines 14 are seated in the spline grooves 22 in the chuck at the beginning of the upward stroke of the piston. It is at this time that the greatest strain is applied to the splines and chuck since the end of the tool 13 has been driven into the rock by the blow of the piston. The chuck and stem are thus rigidly coupled against relative turning movement. As the piston moves upwardly, the torsional strain decreases and the splines 14' possess ample strength to continue the turning of the chuck. The recess 23 below the spline groove 22 in the chuck is of sufficient diameter to receive the splines 14' but is of substantially smaller diameter than the cylinder defined by the bottoms of the spline grooves 22. Therefore the side walls of the chuck surrounding the recess 23 are substantially thicker than the thinnest portions of the walls surrounding the grooved portion of the chuck. These side walls of the chuck surrounding the recess 23 therefore possess ample strength to transmit the torque of the piston at any position thereof, and the grooved portion of the chuck possesses sufficient strength since it is at all times engaged by splines. The chuck and stem are in this position loosely coupled against turning movement.

In operation, the piston 11 is reciprocated in the cylinder 10 by means of fluid pressure controlled by any conventional valve mechanism co-ordinated with the motion of the piston. As the piston reciprocates, the stem 27 transmits rotary movement to the piston upon its upward stroke, this motion in turn being transmitted to the chuck 20 and tool 13 through the interengaged splines 22—14—14'.

By virtue of the circumferentially reduced spline portion 14' and the relatively short spline section 22 a wider latitude of machining tolerances may be permitted throughout the assemblage as the clearance between the crest of the keys 14' and the root of the splines 22 will permit the stem to accommodate itself to any axial variance extant in the organization.

Furthermore the relation of the diametric proportions of the telescopic members may be suitably co-ordinated to attain the maximum strength of the various elements of the mechanism without enlarging the diameter of the machine per se as the decreased circumferential portion 14' of the stem will facilitate a greater wall thickness of the chuck 20 circumjacent the recess 23 which wall is susceptible to fracture under the vibrational and torque strains imposed thereupon.

By constructing the working parts of a pneumatic drill of this type in the manner described herein, the elements which are subjected to stress may be suitably proportioned to allow an adequate factor of safety, without increasing the weight of the drill. Moreover a drill thus constructed will accommodate slight structural misalignment of parts without endangering the reciprocatory elements to the deleterious bending strains to which they are customarily subjected.

Although the foregoing description is necessarily of a detailed character in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a drill, a piston having a splined stem, the portion of said splines adjacent the free end of said stem being of less depth than the remainder thereof.

2. In a drill, a piston having a stem provided with longitudinal splined grooves and splines interjacent said grooves the bottoms of said grooves being parallel, and the portion of said splines adjacent the free end of said stem being of less height than the remainder thereof.

3. In a drill, a slidable coupling comprising an externally splined stem member and an internally splined hollow member presenting spline grooves, said stem member being telescopically received in said hollow member with said splines meshing, the splines of said stem member being spaced from the bottoms of the spline grooves in said hollow member when said stem member is partially received in said hollow member whereby said members are loosely coupled against relative turning movement, said splines on said stem member having portions thereof substantially in contact with the bottoms of the splined grooves in said hollow member when said stem member is further received in said hollow member whereby said members are rigidly coupled against relative turning movement.

4. In a percussion drill, a reciprocable and rotatable hammer having a splined stem portion, a hollow chuck having its outer end portion arranged to slidably receive a tool and having its inner end portion internally splined for co-action with said stem portion, the outer end of the splined portion of said stem having a reduced external diameter, and a recess in said chuck intermediate the ends thereof and being of a diameter to receive only the reduced portion of said stem.

5. In a percussion drill, a reciprocable and rotatable hammer having a splined stem portion, the outer end of said splined portion being of reduced external diameter, and a hollow chuck having its outer end portion arranged to slidably receive a tool and having its inner end portion internally splined for co-action with said stem, the portion of said chuck intermediate the ends thereof being arranged to receive only the reduced portion of said stem.

6. In a percussion drill, a reciprocable and rotatable hammer having a stem portion with relatively shallow splines adjacent the outer end thereof, and relatively deep splines adjoining said shallow splines, and a hollow chuck having one end arranged to receive a tool and having its opposite end internally splined for cooperation with either of said sets of splines on said stem portion, the portion of said chuck intermediate said ends being arranged to receive only said shallow splines.

In testimony whereof I hereunto affix my signature this 26th day of September, 1929.

JOHN E. RENFER.